United States Patent
Sarma

(10) Patent No.: US 7,904,527 B2
(45) Date of Patent: Mar. 8, 2011

(54) SYSTEM AND METHOD FOR REMOTE SERVICING OF EMBEDDED DEVICES

(75) Inventor: Srinivas G. Sarma, Durham, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 2264 days.

(21) Appl. No.: 10/260,834

(22) Filed: Sep. 30, 2002

(65) Prior Publication Data
US 2004/0073654 A1    Apr. 15, 2004

(51) Int. Cl.
G06F 15/16    (2006.01)
(52) U.S. Cl. .................................... 709/217; 709/227
(58) Field of Classification Search ............... 709/217, 709/227
See application file for complete search history.

(56) References Cited

U.S. PATENT DOCUMENTS

| | | | | |
|---|---|---|---|---|
| 5,845,203 A * | 12/1998 | LaDue | ......................... | 455/414.1 |
| 6,115,645 A | 9/2000 | Berar | | |
| 6,138,249 A | 10/2000 | Nolet | | |
| 6,192,034 B1 * | 2/2001 | Hsieh et al. | ..................... | 370/241 |
| 6,259,700 B1 * | 7/2001 | Hsieh et al. | ..................... | 370/400 |
| 6,393,591 B1 | 5/2002 | Edmondson et al. | | |
| 6,438,688 B1 * | 8/2002 | Nunn | ................................. | 713/2 |
| 6,792,321 B2 * | 9/2004 | Sepe, Jr. | .......................... | 700/65 |
| 6,947,675 B2 * | 9/2005 | Koyama et al. | ..................... | 399/8 |
| 6,993,681 B2 * | 1/2006 | Haynes et al. | ................... | 714/23 |
| 2001/0047410 A1 * | 11/2001 | Defosse | ......................... | 709/224 |

FOREIGN PATENT DOCUMENTS

| | | |
|---|---|---|
| EP | 1209566 | 5/2002 |
| EP | 1239371 | 9/2002 |
| WO | 0241105 A2 | 5/2002 |

OTHER PUBLICATIONS

How Network Works, By Frank J. Derfler, Jr & Les Freed, Sixth Edition, Oct. 2002, Chapters 9-14.*
PCT International Search Report dated Mar. 17, 2004.
Official Action issued in corresponding Japanese Patent Application No. 2004-539361 filed Jan. 24, 2005.

* cited by examiner

Primary Examiner — Krista M Zele
Assistant Examiner — Asghar Bilgrami
(74) Attorney, Agent, or Firm — Coats & Bennett, PLLC.

(57) ABSTRACT

A service system permits remote personnel to service a local embedded device. In an exemplary application, the device being diagnosed communicates with a local computer system that interfaces to a remote computer system via, for example, the Internet. A service program may be downloaded to the local computer system that enables diagnostic interaction with the device by the remote computer system. In some instances, the device is automatically queried for model number and/or other identifying information such that the service program is matched to the particular device being diagnosed. In other embodiments, a local user might, for example, visit a designated Web page, enter identifying information, and the appropriate diagnostic program, such as a JAVA applet, downloads to the local system. The downloaded applet may be used by the remote computer system to, for example, query the device, control its operation, re-program it, receive real-time operational data, etc.

36 Claims, 5 Drawing Sheets

SYSTEM AND METHOD FOR REMOTE SERVICING OF EMBEDDED DEVICES

BACKGROUND OF THE INVENTION

The present invention generally relates to serving embedded devices and particularly relates to remotely servicing an embedded device or system.

Embedded systems play a significant role in every day life although the users of such systems may not appreciate that role or even realize the inner workings of those systems. For example, few people give any regard to the embedded systems that drive the operations of their microwave ovens and other household appliances, their televisions and other entertainment devices, and their personal communication devices. While the capabilities and uses of embedded systems vary widely, at least some characteristics are generally common. For example, few embedded systems provide much of an operator interface at least as regards an interface that might be suitable for examining their inner workings on a detailed basis for diagnostic purposes. Indeed, one of the driving factors responsible for the wide proliferation of embedded systems is their ability to shield the complexities of their inner workings from those that use the devices. Thus, one hallmark of embedded systems is that they are oftentimes inscrutable to the casual observer, or even to an experienced technician without the proper tools or diagnostic software.

One consequence of this inscrutability is that detailed diagnosis of an embedded system's operation oftentimes requires direct interaction with the embedded device by a technician or other skilled operator using specialized software offering access to the inner workings of the device. Generally, such access requires the technician to visit the location of the embedded device or for the embedded device to be sent to a service center for diagnosis and repair by qualified technicians. While some embedded devices provide remote access, such access is oftentimes limited to rudimentary interaction with the device and generally does not support the participation of local personnel in the diagnostic or troubleshooting effort.

BRIEF SUMMARY OF THE INVENTION

The present invention provides a method and apparatus supporting remote servicing of embedded systems, such as portable communication devices. In an exemplary embodiment, a service program running on a local system enables diagnostic interaction between an embedded device communicatively coupled to that local system and a remote system having access to the local system, such as network access via the Internet. The service program executing on the local system allows detailed diagnostic interaction between a supporting service program executing at the remote system and the embedded device. Further, in at least some exemplary embodiments, the service system supports two-way interaction between an operator at the local system and an operator at the remote system by providing interactive display screens at each location that allow the entry and display of operator input and service feedback at both locations.

In an exemplary embodiment, a local operator communicatively couples the embedded device to be serviced to the local system and then accesses a Web page associated with the remote system such as by entering a designated URL into a Web browser running on the local system. The Web page might present the user with a data entry form into which the local operator can enter identification or model number information for the embedded device and additionally enter a problem description. This locally entered data is then transferred to the remote system where it may be acted on automatically by the remote system or displayed to an operator of the remote system for action by that operator, or some combination thereof. Regardless, the remote system might then transfer the appropriate service program or routine to the local system, such as by downloading a JAVA applet to the local system, whereupon execution of the downloaded routine by the local system provides the remote system with interactive access to the embedded device.

Of course, many exemplary variations may be practiced with regard to establishing such interaction. In at least one exemplary embodiment of the present invention, the local system accesses either a downloaded or a locally stored service program that initially queries the embedded device for identification information and automatically transfers such information to the remote system. In turn, the service program executing at the remote system may transfer additional, specific diagnostic programs or routines to the local system responsive to receiving such information. Note that with such interaction between the local and remote systems, one or both such systems might employ authentication systems, such as keyed hardware dongles and/or digital certificates, to prevent unauthorized use of diagnostic services and software.

While the present invention is applicable to a wide variety of embedded device types, an exemplary application involves a wireless network service provider responsible for insuring the correct operation of large numbers of mobile stations used by its subscribers. In this context, the service provider's service center would include a local computer system having network access to, for example, a remote computer system maintained by a mobile station vendor. The mobile station vendor would maintain specialized service and/or control information, e.g., diagnostics software, on the remote computer system such that a technician at the service center could log into the remote system. In this manner, the specialized software and skilled technicians at the remote site could gain interactive access to the mobile stations at the service provider's site without having to physically visit the provider's site. The use of remote servicing and diagnostics might even be extended to end users, i.e., consumers, of wireless communication devices or other embedded devices, where such users can be provided remote diagnostic services based on payment of a corresponding service fee, for example.

DETAILED DESCRIPTION OF THE INVENTION

Figure 1:
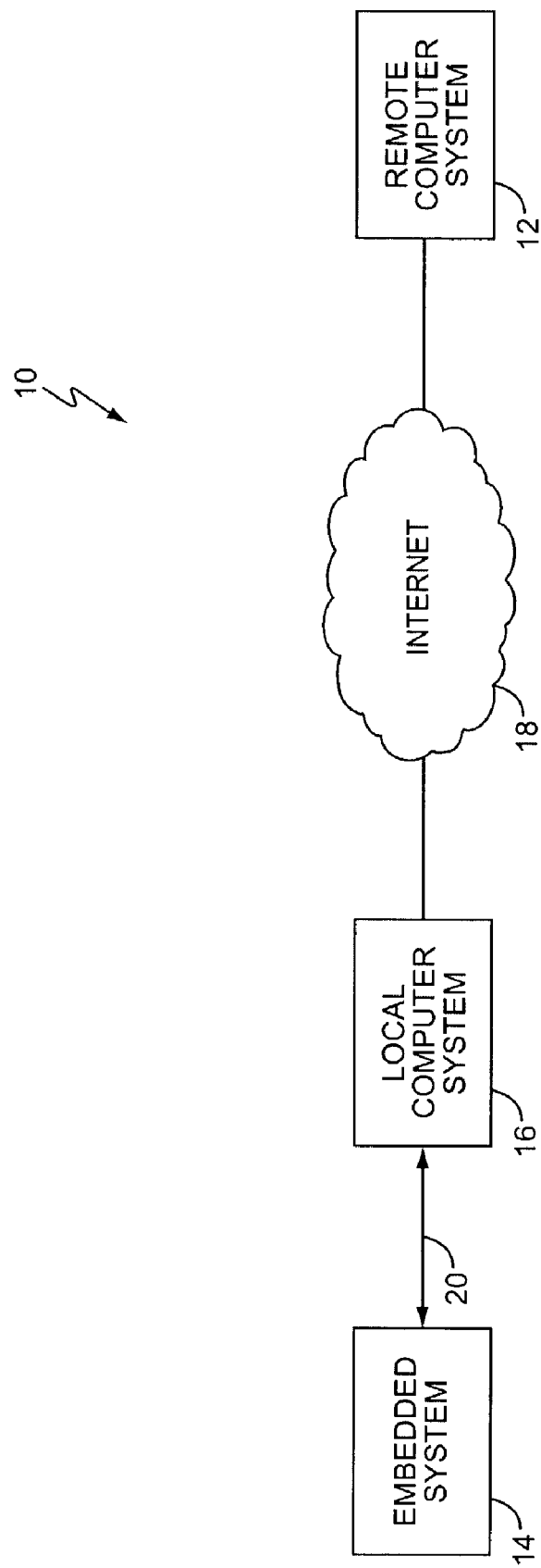
FIG. 1 is a diagram of an exemplary remote service system.

FIG. 1 illustrates an exemplary system generally referred to by the numeral 10 that supports remote servicing and general diagnostics for embedded devices. A remote computer system 12 interacts with an embedded system or device 14 through a local computer system 16. Generally remote system 12 communicates with local system 16 through a computer network or a combination of networks, such as the Internet 18. In supporting service interaction with the embedded device 14 from the remote system 12, local system 16 is communicatively coupled with embedded device 14 through a communication link 20. Communication link 20 may comprise a direct cable connection, a local network connection, or essentially any other type of physical or wireless communication link, such as Bluetooth, 802.11b, or optical wireless link.

In an exemplary embodiment, local system 16 executes a first service program which enables local system 16 to act as a gateway or interface to embedded device 14 from the perspective of remote system 12. That is, the service program executing on local system 16 allows a supporting service program executing on remote system 12 to interact with embedded device 14 essentially as it would if embedded device 14 were physically connected to remote system 12. In this manner, remote system 12 may retrieve diagnostic and other service-related information from embedded system 14, such as operating logs or even real-time operating information, and may update the operating firmware or system program of embedded device 14.

Further, an operator of remote system 12 may flexibly interact with embedded device 14 and with an operator of local system 16. As an example, remote system operator may issue commands to embedded device 14 and observe its responses to those commands, may adjust or alter the operating or configuration parameters in embedded device 14, and may provide feedback to the local system operator based on the results of his or her diagnostic work. Indeed, in at least one exemplary embodiment of system 10, remote system 12 and local system 16 provide their respective operators with interactive screens allowing the operator of local system 16 to enter problem information useful in directing the service efforts of the operator of remote system 12, who may be a skilled technician or engineer.

Likewise, the service program executing on remote system 12 preferably provides an interactive screen into which its operator may enter diagnostic feedback for display by the local computer system 16 and, indeed, may provide for interactive "chat" type services between the local and remote operators. In this vein, the present invention encompasses the array of communication technologies that might be implemented between remote system 12 and local system 16, including video conferencing technology such as those based on the H.323 video conferencing standards, live "chat" applications, and/or other network based communication schemes.

Figure 2:
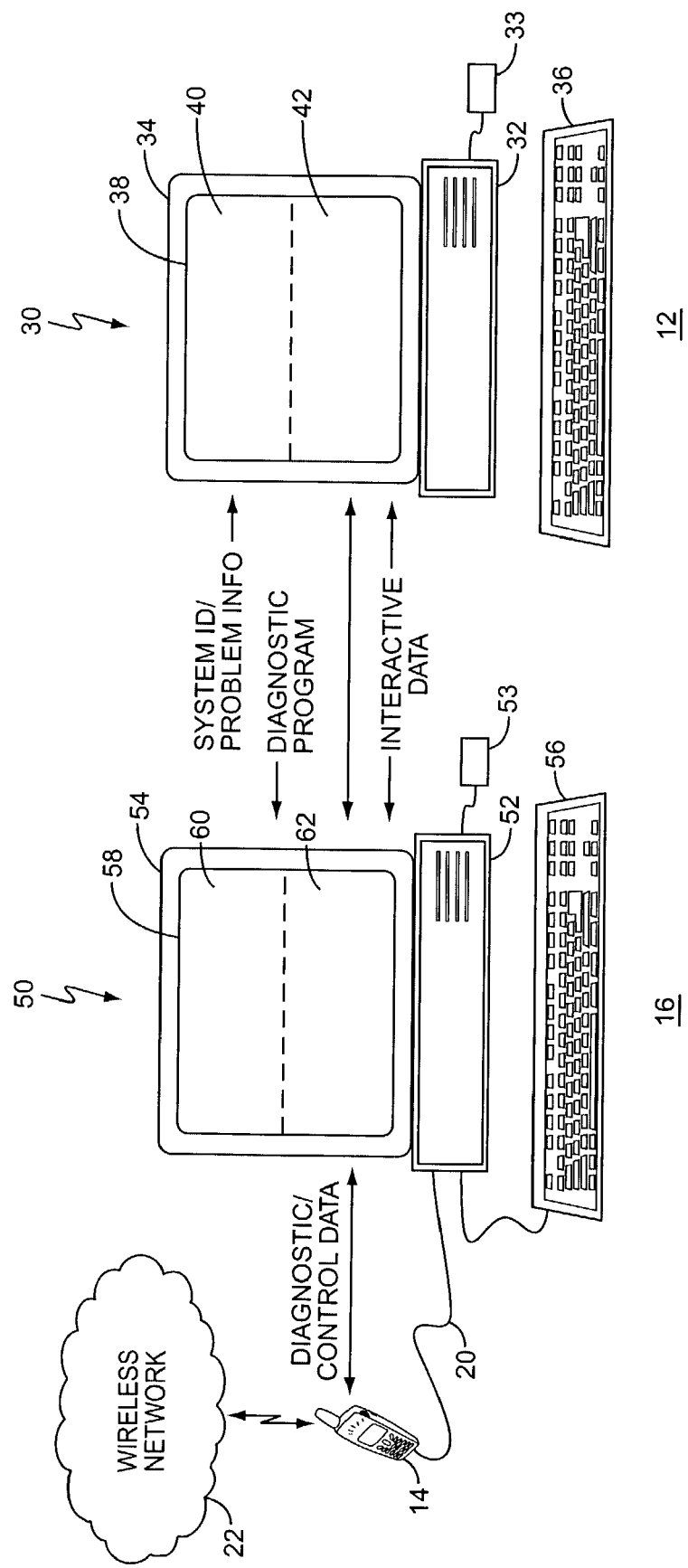
FIG. 2 is a diagram of exemplary embodiments for the local and remote computer systems in the service system of FIG. 1.

FIG. 2 is a diagram of exemplary details for selected aspects of the system 10. Remote system 12 includes one or more computer systems 30, with an exemplary one of the computer systems 30 comprising a processing system 32, a dongle or authentication unit 33, a display unit 34, and one or more input devices 36. As noted, computer system 30 may host a supporting service program which advantageously displays diagnostic related information in an on-screen display 38, which display may be divided between an input display area 40 and an output display area 42. Thus, display 38 may provide the operator of remote system 12 with an input screen into which that operator may enter information for transfer to the local system 16 where it may be displayed to the local operator. Similarly, the same display 38 may be configured to display information received from embedded device 14 and/or information entered by the local operator of local system 16.

Those skilled in the art will understand that remote system 12 may comprise multiple computer systems 30, and may include a mix of personal computers and servers and in any case includes one or more entities providing access directly or indirectly to the Internet 18. As such, remote system 12 preferably includes or is associated with Web server features enabling it to host one or more Web pages used in support of remote servicing operations. Also, note that the use of authentication device 33 is optional, and that, even if authentication is used, such authentication may comprise software-based digital certificates or other software-based authentication. The use of authentication device 33 merely represents one, relatively secure and tamper-proof mechanism for identifying the remote system 12 as a legitimate diagnostics machine. Such identification may be verified by either or both the device 14 and the local system 16.

Local system 16 generally includes one or more computer systems 50, including a processing system 52, a dongle or other authentication unit 53, display unit 54, and one or more input devices 56. Display unit 54 preferably displays information associated with remote diagnostic operations, and includes input display area 60 and an output display area 62. Input display area 60 supports data entry by the local operator for transfer to the remote system 12. Similarly, output display area 62 displays information returned to the local system 16 from the remote system 12, and may be used to display diagnostic and control information received from the embedded device 14.

It should be understood that the screen arrangements described for local system 16 and remote system 12 simply represent one of an almost limitless number of possible arrangements, and the information needed for local or remote displays depends on the degree of automation employed in the diagnostic operations. Also, note that the use of authentication device 53 is, as with authentication device 33, an optional measure to ensure security and provide authorization for diagnostic operations, and may not be used at all, or security software may be used in place of such security hardware.

Figure 3:
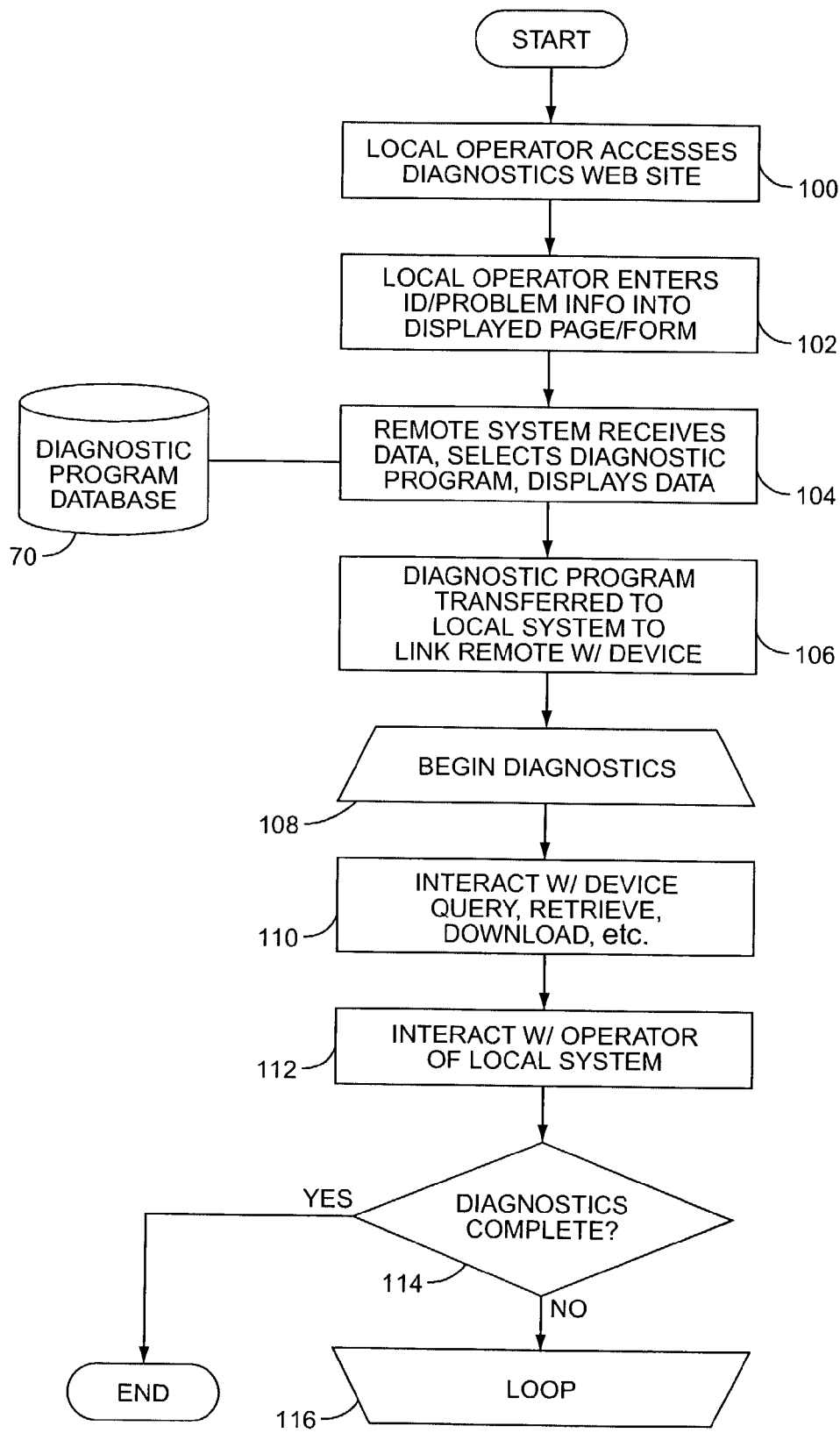
FIG. 3 is a diagram of exemplary flow logic supporting remote servicing.

FIG. 3 illustrates exemplary diagnostic operations that involve at least some degree of interaction between local and remote operators. Processing begins with the local operator accessing a diagnostic Web site that is associated with the remote system 12 (Step 100). Generally, the local system 16 hosts a Web browser or similar software which displays the associated Web page to the operator and preferably permits the operator to enter identification and/or authorization information and possibly a problem description into a Web page form (Step 102). The remote system 12 receives the data input by the local operator (Step 104). The remote system 12 may automatically analyze the received data and select an appropriate diagnostic program, i.e., one matching the identified model number of the embedded device 14 for which diagnostics is sought, or may simply display the received data in an appropriate format to the operator of the remote system 12. In this latter case, the remote operator may select the appropriate diagnostic program and may take one or more actions based on the problem information reported by the local operator.

In either case, the selected diagnostic program is transferred to the local system 16 (Step 106) for local execution. The diagnostic program may be transferred as a downloadable program, such as a JAVA applet. Once the diagnostic program begins execution on the local system 16, the remote system 12 gains interactive diagnostic access to the embedded device 14. Thus, the remote system 12, either in automatic fashion or under control by the remote operator, begins diagnostic operations (Step 108). Such operations generally include interaction with the device 14, which interaction might involve querying the device 14, retrieving data from it, and downloading updated program code or desired operating commands to the device 14 (Step 110). Further, diagnostic operations may involve interaction between the remote and local operators (Step 112), as explained earlier. That is, the remote and local operators may exchange information in support of the diagnostic operations. If diagnostics are complete (Step 114), the remote diagnostic interaction ends, which may involve termination of the downloaded diagnostic program at the local system 16. If diagnostics are not complete, operations generally loop back (Step 116) with continued interaction between the remote system 12 and the embedded device 14.

It may be desirable to design the downloaded diagnostic program to be transient in nature such that an executable image of the program is not persistently stored at local system 16. The advantage of such transient program existence includes protection of potentially proprietary device command sets and interaction routines. However, it should be noted that in some instances, local system 16 might store one or more diagnostic programs for support of remote diagnostics by remote system 12 without need for the transfer of diagnostic routines from system 12 to system 16.

Figure 4:
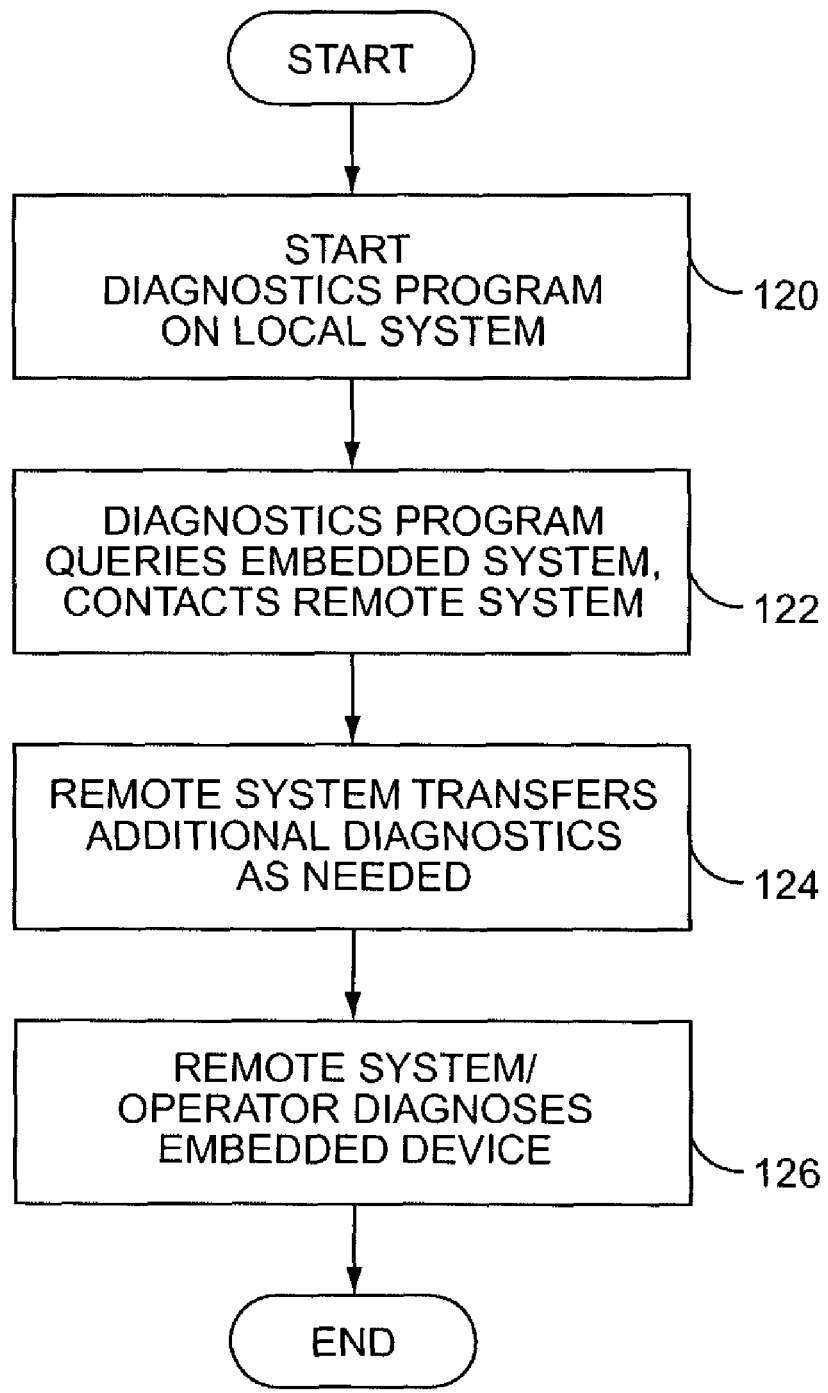
FIG. 4 is a diagram of alternate exemplary flow logic supporting remote diagnostics.

FIG. 4 illustrates alternate exemplary flow logic associated with local storage of one or more diagnostic routines at local system 16. Here, operations begin with activation of the diagnostics program stored on local system 16 (Step 120). The diagnostics program queries the embedded device 14 via communication link 20, and automatically contacts remote system 12 (Step 122). Obviously, such operation might be modified to query the local operator as to whether the remote system 12 should be contacted. As part of this initial contact, the local system 16 may transfer device identification information to the remote system 12, such that remote system 12 may transfer additional diagnostic routines as needed based on the specific device type for which diagnostic operations are to be supported (Step 124). Once the necessary additional diagnostic routines, if any, are in place, the remote system 12 may begin diagnostic operations. Such operations may execute automatically, under control of the remote operator, or some combination thereof (Step 126).

Figure 5:
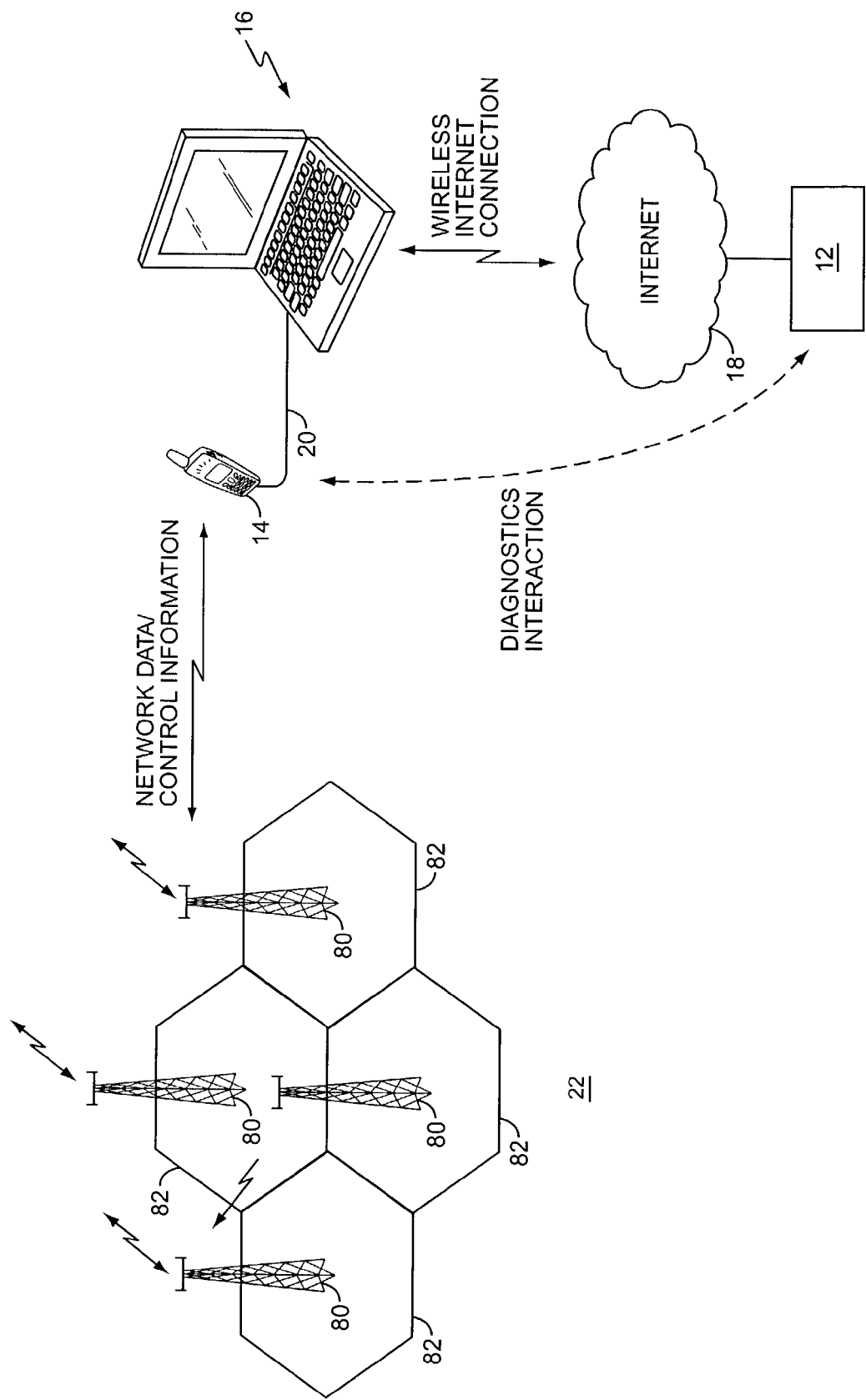
FIG. 5 is a diagram of an alternate exemplary embodiment of a remote diagnostic system as might be used in wireless network troubleshooting.

As with the many variations that may be practiced with regard to the transfer of diagnostic routines or programs between local system 16 and remote system 12, the type of diagnostic interaction that remote system 12 may engage in also varies widely. As an example, FIG. 5 illustrates an exemplary diagnostic operation where the embedded device 14 comprises a wireless communication device such as a mobile station, e.g., cellular telephone, wireless PDA, or other such device. In an exemplary embodiment, local system 16 comprises a laptop computer or other portable computing system, which has a wireless Internet connection enabling it to communicate with remote system 12 via the Internet 18.

With this configuration, a local operator may travel to various locations within a supporting wireless communication network 22 while feeding back diagnostic information regarding operation of the embedded device 14 within the wireless communication network. That is, remote system 12 may gain access to, for example, streaming real-time data associated with control and data signaling between the embedded device 14 and its supporting network 22, such as between various base stations 80 in one or more cell sites 82. In this manner, a wireless system operator may provide a mobile station vendor with detailed network data for various strategic locations in the network, such as locations where network subscribers have reported an unusual incidence of communication difficulty or abnormal performance.

Even where the local system 16 is not mobile, system 10 may be used by a mobile station vendor to gain access to real-time and/or historical operating data of a mobile station's operation within a supporting wireless communication network 22. As an example, where the embedded device 14 supports wireless communication with a network 22, remote system 12 may observe and/or control signaling and data passing between the device 14 and the network 22. Indeed, the remote system 12 may change or alter the device's configuration on the fly to affect such interaction, or to command device 14 to carry certain actions designed to facilitate the troubleshooting effort, such as performing selected dialing operations or generating selected signaling information. One significant advantage of such interaction is that remote diagnostics depend on the link 20 between the device 14 and local system 16 rather than on the wireless communication interface of device 14 used to support communications with the supporting network 22.

In general, the present invention supports interactive diagnostics of an embedded device 14 via a remote system 12. As such, the present invention is not limited to the above exemplary details, but rather is limited only by scope of the following claims and the reasonable equivalents thereof.

What is claimed is:

1. A method of supporting remote service of embedded systems, the method comprising:
   receiving a service request at a remote computer system linked via computer network to a local computer system originating the service request, and wherein the local computer is communicatively coupled to an embedded device for which diagnostics are desired;
   interacting with the embedded device from the remote computer system responsive to the service request; and
   providing service feedback to the local computer system based on interacting with the embedded device.

2. The method of claim 1, wherein the service request includes device identification information, and wherein interacting with the embedded device from the remote computer system responsive to the service request comprises:
   selecting service software for the embedded device based on the device identification information, wherein the service software enables remote access and control of the embedded device from the remote computer system; and
   transferring the service software to the local computer system via the computer network for execution by the local computer system.

3. The method of claim 2, wherein the computer network comprises the Internet, and wherein receiving a service request at a remote computer system comprises receiving a Web-based request.

4. The method of claim 3, wherein transferring the service software to the local computer system comprises transferring an executable applet via the Internet to local computer system.

5. The method of claim 3, wherein providing service feedback to the local computer system based on interacting with the embedded device comprises transferring service information to the local computer system for display to an operator of the local computer system.

6. The method of claim 3, wherein the service software provides interactive communication between the local computer system and the remote computer system, such that operators of the local and remote computer system can communicate in support of servicing the embedded device.

7. The method of claim 1, wherein interacting with the embedded device from the remote computer system responsive to the service request is based on executing a first service program on the local computer system that enables access to and control of the embedded device, and executing a second service program on the remote computer system that interacts with the first service program.

8. The method of claim 7, further comprising transferring the first service program to the local computer system responsive to receiving the service request.

9. The method of claim 8, further comprising selecting the service program from among a plurality of service programs based on device identification information included in the service request.

10. The method of claim 8, wherein receiving the service request comprises receiving a Web-based request originated from a Web browser application executing on the local computer system.

11. The method of claim 1, wherein the method of supporting remote service of embedded systems comprises a Web-based service system, and wherein receiving a service request at the remote computer system comprises receiving a Web-based service request at a Web server associated with the remote computer system.

12. The method of claim 11, wherein interacting with the embedded device from the remote computer system comprises interacting with the embedded device from the remote computer system via the Internet.

13. The method of claim 1, wherein providing service feedback to the local computer system based on interacting with the embedded device comprises providing a service report for display on the local computer system.

14. The method of claim 1, further comprising:
    transferring service cost information to the local computer system in advance of the step of interacting with the embedded device;
    selectively performing the step of interacting with the embedded device based on whether a payment indication is received.

15. The method of claim 14, wherein transferring service cost information to the local computer system comprises:
    transferring a Web-based form of service costs; and
    receiving return form information indicating the service costs approved by a user of the local computer system and a method of payment.

16. The method of claim 1, wherein receiving the service request comprises receiving identification information from the local computer system at the remote computer system via the Internet.

17. The method of claim 16, wherein receiving the identification information via the Internet comprises receiving data entered into the local computer system by a user of the local computer system.

18. The method of claim 17, further comprising providing a Web server function in association with the remote computer system and transferring Web page information to a Web browser hosted by the local computer system such that the user of the local computer system enters the data into a Web page displayed by the local computer system.

19. The method of claim 1, wherein interacting with the embedded device is based on transferring a selected diagnostic application to the local computer system via the Internet.

20. The method of claim 19, wherein sending the diagnostic application to the local computer system via the Internet comprises transferring a downloadable applet to the local computer system responsive to a user of the local computer system accessing a defined URL via the Internet.

21. The method of claim 1, wherein the embedded device comprises a wireless communication device, and wherein interacting with the embedded device from the remote computer system comprises retrieving diagnostic data from the wireless communication device related to operation of the wireless communication device in an associated wireless communication network.

22. The method of claim 21, wherein retrieving diagnostic data from the wireless communication device comprises receiving real-time operating data from the wireless communication device.

23. The method of claim 21, wherein retrieving diagnostic data from the wireless communication device comprises receiving one or more operating logs stored in the wireless communication device.

24. The method of claim 1, wherein the interacting with the embedded device from the remote computer system comprises transferring program code to the embedded device to update operating code of the embedded device.

25. The method of claim 1, wherein the embedded device comprises a wireless communication device and the local computer system comprises a portable computer having a wireless connection to the Internet, and further comprising streaming data related to operation of the wireless communication device within a supporting wireless network to the remote computer system.

26. The method of claim 25, further comprising moving the wireless communication device and portable computer to one or more desired locations within the supporting wireless network to collect the data specifically for the one or more desired locations.

27. A system for providing remote service of embedded devices, the system comprising:
    a local computer system including first and second communication interfaces for communicating with an embedded device and a computer network, respectively, and further including a memory for storing a first service program and a processor for executing the first service program;
    a remote computer system including a first communication interface for communicating with the local computer system via the computer network, and further including a memory for storing a second service program and a processor for executing the second service program; and
    said first service program executing on the local computer system enabling the second service program executing on the remote computer system to interact with the embedded device via the computer network.

28. The system of claim 27, further comprising a Web server associated with the remote computer system, and wherein the Web server hosts a Web page through which an operator of the local system initiates remote service of the embedded device.

29. The system of claim 27, further comprising a database of service programs, and wherein the first service program comprises a selected one of the service programs transferred to the local computer system by the remote computer system.

30. The system of claim 29, wherein the embedded device comprises a wireless communication device, and further wherein the database of service programs comprises different diagnostic programs corresponding to different types of wireless communication devices.

31. The system of claim 27, wherein the second service program provides display output on the remote computer system to display selected data sent by the local computer system.

32. The system of claim 31, wherein the first service program provides an operator interface allowing an operator of the local computer system to enter data associated with servicing the embedded device.

33. The system of claim 32, wherein the first service program transfers data entered by the operator of the local computer system to the remote computer system.

34. The system of claim 27, wherein the first and second service programs generate interactive screens at the local and remote computer systems, respectively, thereby allowing interaction between operators of the local and remote computer systems in support of servicing the embedded device.

35. The system of claim 27, wherein the first service program comprises a diagnostic program transferred from the remote computer system to the local computer system.

36. The system of claim 35, wherein the diagnostic program comprises a JAVA applet.

* * * * *